INVENTOR.
ENRIQUE BERNAL G.
DI CHEN
WAYNE L. WALTERS

ATTORNEY

United States Patent Office 3,501,220
Patented Mar. 17, 1970

3,501,220
MULTIDIMENSIONAL OPTICAL DATA
DISPLAY APPARATUS
Enrique Bernal G. and Di Chen, Minnetonka, and Wayne
L. Walters, Bloomington, Minn., assignors to Honeywell
Inc., Minneapolis, Minn., a corporation of Delaware
Filed Apr. 24, 1967, Ser. No. 633,258
Int. Cl. G02f 1/26, 3/00
U.S. Cl. 350—150                                11 Claims

ABSTRACT OF THE DISCLOSURE

A digital light positioning apparatus having an electro-optic (E-O) crystal for modifying the polarization state of an incident light beam and a Glan-Thompson prism for passing the light over either of two paths. Internal reflection or transmission of the light beam in the Glan-Thompson prism, depending on the orientation of the polarization vector of the light, determines the beam path. Three preferred embodiments are disclosed: a linear digital display apparatus a two-dimensional digital display apparatus and a three-dimensional digital display apparatus.

BACKGROUND OF THE INVENTION

This invention relates to an optical apparatus for digitally controlling the position of a light beam. An apparatus which "digitally" controls the position of a light beam is one which positions the beam in any one of several discrete locations. Digital-indexed light positioners previously known in the art are based on the principle of polarization-dependent refraction of a light beam entering a birefringent crystal. This type of apparatus has been used in multiple stage arrangements to linearly position a light beam in any one of several discrete spots. However, any apparatus based on refraction will deflect light beams of different wave lengths to different positions. In such apparatus, the relative displacement of the beams is proportional to the product of the angle of refraction and distance. For large displacements, large distances or throws are used; hence, any wave length dependence of the angle of refraction produces relatively large positioning errors. Also, the use of refraction techniques requires a relatively large bulk of optical material to obtain beam separation.

SUMMARY

The light positioning apparatus in accordance with the present invention utilizes the principle of internal reflection rather than refraction. There is thus provided a relatively broad band apparatus capable of large deflection. Furthermore and more important, utilization of the principle of internal reflection rather than refraction lends itself to the use of a variety of arrays which are capable of positioning light beams at various discrete spots.

The basic form of the apparatus in accordance with this invention comprises first and second optical elements adapted to be interposed in a beam of linearly polarized light, the first optical element being operable to either pass the light as received or to rotate its polarization vector to a different direction, the second optical element including reflective means arranged to receive the light passed by the first optical element and to pass it over one path when the polarization vector is in one direction and to reflect it over a second path when the polarization vector is in another direction.

It can be seen from the above description of the two optical elements that this invention broadly provides a combination capable of selectively establishing either of two paths for an incident linearly polarized light beam. There is thus provided an apparatus capable of digitally positioning a light beam in either of two spots. As will be described hereinbelow in detail, this basic apparatus may be incorporated into various arrays for positioning a light beam in any manner of ways.

BRIEF DESCRIPTION OF THE DRAWING

For a better understanding of the invention, reference should be had to the accompanying drawing wherein:

FIGURES 1 and 2 are diagrammatic views of the basic light positioning unit of the invention showing the light beam in two positions respectively;

FIGURE 2a is a diagrammatic view of an alternative arrangement for use in the unit of FIGURES 1 and 2.

FIGURE 3 is a diagrammatic view of a linear digital light positioning apparatus;

FIGURE 3a is a cross sectional view of a portion of FIGURE 3 showing the positions of two electrodes on the electro-optic crystals;

FIGURES 4 and 5 are front and side views respectively of an array of the basic units arranged to position a light beam in accordance with two dimensions X and Y in an image plane of a utilization means.

DESCRIPTION OF THE PREFERRED EMBODIMENTS

Figure 6:
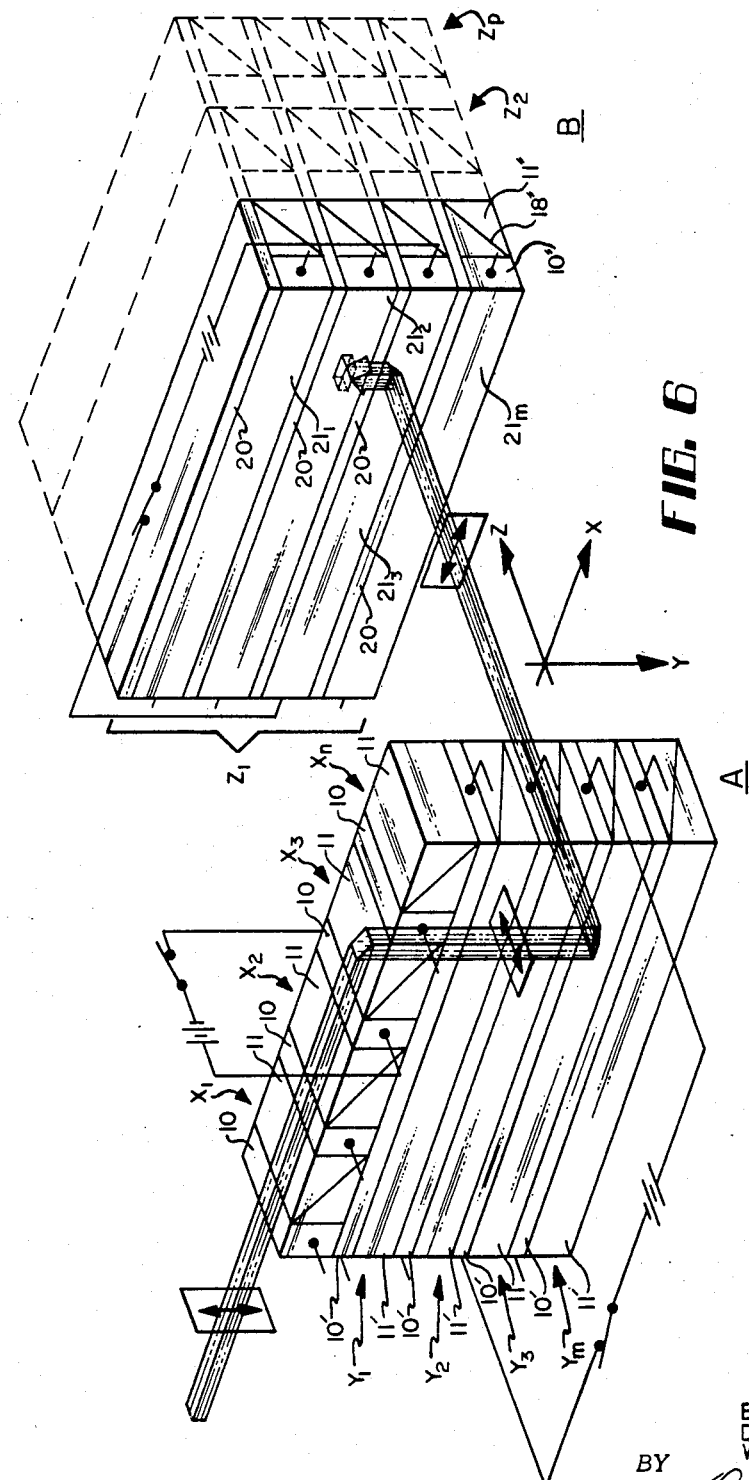
FIGURE 6 is a diagrammatic perspective view of a partially exploded three-dimensional optical data display apparatus.

Referring to the drawing, and more particularly to FIGURES 1 and 2, there is shown a light positioning unit having a first optical means 10 capable of rotating the polarization vector of incident light, such as an E-O crystal and a second optical means 11 such as a Glan-Thompson prism having a reflective boundary capable of reflecting light when it is polarized in one direction and passing it when it is polarized in another direction. The unit is interposed in a beam of linearly polarized light provided by a light source 12 and a polarizer 13. Light source 12 may take the form of a laser in which case polarizer 13 will not normally be required. E-O crystal 10 includes oppositely positioned electrodes 14 and 15, voltage source 16 and switch means 17 by means of which the E-O crystal may be activated to rotate the polarization vector of an incident light beam. The Glan-Thompson prism includes reflective means such as the calcite boundary indicated at 18 for reflecting or passing light received from E-O crystal 10 depending on the direction of its polarization vector.

The first optical means may consist of any field responsive optical means, such as a material exhibiting the magneto-optic Faraday effect or the Pockels or Kerr electro-optic effects. Materials exhibiting such effects are generally known in the art as magneto-optic (M-O) or electro-optic (E-O) materials, such as crystals, glasses and even liquids. E-O crystals capable of producing 90° rotation of the vector of linearly polarized light in response to an applied electric field are well known in the art. Rotation of the polarization vector is accomplished by impressing a half-wave retardation voltage to the crystal. Examples of such crystals are potassium tantalate niobate (KTN), lithium niobate (LN) and potassium dihydrogen phosphate (KDP). Such E-O crystals are preferred for use with the present invention in view of the large amount of rotation produced. However, other materials producing lesser or greater amounts of rotation are acceptable for use with this invention as are various magneto-optic crystals and the like. For example, FIGURE 2a shows element 10 alternatively as an M-O crystal.

The second optical element of the unit may be any other type of polarizing prism, such as Glan or Nicol prisms. All polarizing prisms possess the property of transmitting light having a polarization vector in one direction and reflecting light at the boundary contained therein when the polarization vector is in a different direction.

As shown in FIGURE 1, with switch means 17 open, linearly polarized light having a polarization vector of one direction is passed by both the E-O crystal and the Glan-Thompson prism over a first path with the polarization vector or direction unchanged. When switch means 17 is closed as in FIGURE 2, the polarization vector of the linearly polarized light is rotated 90° by E-O crystal 10 and reflected over a second path at calcite boundary 18 of the Glan-Thompson prism 11. With the arrangement shown in FIGURES 1 and 2, the beam can be deflected from one path to another by a large angle. It is easily seen from this arrangement that the light beam can be digitally positioned in either of two spots.

A linear array of the basic units shown in FIGURES 1 and 2 may be utilized to provide linear digital light beam positioning. If desired, the units may be united by gluing them together with index-matching cement to provide an integrated array and to minimize reflection losses. Such an array is shown in FIGURE 3 which consists of a plurality of units generally designated as $X_1, X_2, \ldots X_n$ respectively. Each unit consists of an E-O crystal 10 and a Glan-Thompson prism 11. Each E-O crystal of the array carries a pair of oppositely disposed electrodes 14 and 15 which are connected to a switch means 17 and a voltage source 16 by means of which a half-wave retardation voltage may be selectively applied to any one of the E-O crystals. For purposes of simplicity, only one of the E-O crystals is shown connected to a voltage source and a switch means. This approach will be used throughout the specification for the sake of convenience. Of course the particular position of the electrode on element 10 will depend on the particular crystal used. These matters will be obvious to one of ordinary skill in the art.

A utilization means 19, such as a light display screen or a light sensitive means, is positioned to intercept all of the reflected paths capable of being established by any of the X units in the array. There is thus provided an apparatus capable of digitally positioning a light spot linearly in any one of an $n$ number of positions on utilization means 19. For example, the light beam may be positioned as shown in FIGURE 3 when the light positioning unit $X_2$ is activated by closing switch means 17 thus causing the E-O crystal to rotate the polarization vector of the light beam 90° and the Glan-Thompson prism to reflect it onto utilization means 19. Clearly, any one of the X units could be so activated to digitally position the light beam in any one of an $n$ number of spots.

FIGURES 4 and 5 show an array of light positioning units constructed and arranged to provide a two-dimensional display system by positioning a light beam digitally in accordance with X and Y dimensions on an image plane of a light utilization means 19. As can be seen from the drawing, an $n$ number of X units are linearly arranged as in FIGURE 3 to position the light beam in accordance with the X dimension. Units $X_1, X_2, \ldots X_n$ provide a plurality of aligned reflected paths into an $m$ number of Y units. The X units may be separate individual units or they may be glued together to form an integrated lineal array. Furthermore, the entire array of X and Y units may be glued together to form a completely integrated array.

The Y units are essentially the same as the X units but of a modified shape in that they are laterally elongated and of a shape such that each unit individually intercepts all of the reflected paths which may be established by the X units. Each Y unit includes an E-O crystal 10' and a Glan-Thompson prism 11' the same as the basic units described hereinabove. The position in the X dimension for the light beam is controlled by the X units. The position in the Y dimension is controlled by the Y units. As shown in the drawing, unit $X_n$ is activated to provide a first reflected path down through the Y units to determine the position in the X dimension for the light beam. Unit $Y_2$ is also shown in the activated state thus providing a second reflected path and determining the position in the Y dimension for the light beam. The establishment of the second reflected path in one of the Y units is of course accompanied by a further rotation of the polarization vector of the light beam as shown.

For X and Y directional addressing or positioning of the light beam, it can be seen that two switches must be closed, one on the selected X unit and one on the selected Y unit. The particular array shown provides a digital grid-like pattern on light utilization means 19.

Reference is now made to FIGURE 6 of the drawing which shows an array capable of positioning a light beam in accordance with three dimensions X, Y and Z. The figure represents an exploded view of a completely integrated array in the form of a transparent block. The unit is exploded into two sections A and B. The A section is essentially the same as the arrangement shown in FIGURES 4 and 5 whereby the light beam may be positioned in accordance with the X and Y dimensions by selectively activating the proper X and Y units of that portion of the array. As can be seen from FIGURE 6, when the proper X and Y units are activated, the light beam is directed in the Z direction into the B section of the array. The B section of the array consists of a $p$ number of Z units which take the form of a plurality of planar-like structures, $Z_1, Z_2, \ldots Z_p$, each of which consists of an $m$ number of laterally elongated units $21_1, 21_2, 21_3, \ldots 21_m$, the same in shape and structure as the Y units shown in the A section and in FIGURES 4 and 5. However, the units identified as 21 are stacked and oriented such that the reflective boundary 18" of each of the Glan-Thompson prisms 11" will intercept the light beam path established by one of the Y units and provide it with a third reflected path. Immediately above each of the units $21_1, 21_2, 21_3, 21_m$ there is included a layer 20 of transparent light sensitive material the type which upon exposure to light emits radiation or undergoes a change in its absorption spectrum so that the ultimate location of the light beam can be visually observed within the transparent block. Various fluorescent or phosphorescent materials which emit radiation of one wavelength when stimulated by radiation of another wavelength are satisfactory. Examples of such materials are calcium tungstate or the infrared stimulable phosphors. On the other hand, photochromic glasses may also be used.

In the particular embodiment shown in FIGURE 6, the individual units of each Z planar-like section are oriented to reflect the light upwardly to layer 20 of transparent light sensitive material when the corresponding unit of each Z section is activated. As shown, the units $X_3, Y_3$ and $21_3$ of $Z_1$ are activated to position the light beam. For X, Y and Z directional addressing, three switches must be closed, one on each selected X, Y and Z unit.

It can be seen that if several light beams were sequentially positioned in the block in accordance with different distances in the X, Y and Z dimensions, an observer could visually ascertain their relative spatial relationships through the transparent faces of the block by observing the fluorescing spots at their various locations on the bodies 20 of light sensitive material.

While this invention has been particularly shown and described with reference to the preferred embodiments thereof, it will be understood by those skilled in the art that the foregoing and other changes in form and details may be made therein without departing from the spirit and the scope of the invention. For example, materials are well known in the art which may be utilized to provide optical data display devices in accordance with this invention which will operate in the UV, IR or visible wave lengths.

The embodiments of the invention in which an exclusive property or right is claimed are defined as follows:

1. A system for positioning a polarized beam in two dimensions X and Y respectively comprising:
    an array of light positioning units divided into first and second groups for positioning the light beam in the X and Y dimensions, respectively, each of said units including;
        a first optical element responsive to a field and operable to pass the light beam as received in response to a first field and to rotate the beam's polarization direction and pass the beam in response to a second field, and
        a second optical element including reflective means arranged to receive light passed by said first optical element and to pass the beam unreflected over a first path when the light is polarized in one direction and to reflect the beam over a second path when the light is polarized in another direction;
    said first group comprising a plurality of said units positioned and arranged to pass the light unreflected over one path through successive units of said first group and which are operable to individually provide a first reflected path, each first reflective path being representative of a certain position in the X dimension, and
    said second group comprising a plurality of said units positioned and arranged to pass the light in the first reflected path through successive units of said second group, said units of said second group being operable to individually provide a second reflected path, each second reflective path being representative of a certain position in the Y dimension in addition to the certain position in the X dimension provided by said units in said first group whereby the light may be positioned according to certain X and Y dimensions by applying a field to a predetermined unit in each of said first and second groups.

2. The light beam positioning system of claim 1 including a utilization means oriented to receive the light positioned by said first and second groups.

3. The light positioning system of claim 2 wherein:
    said units of said first group are aligned in a row,
    said units of said second group are generally laterally elongated in shape, their individual length being substantially equal to the overall length of said first group row, and aligned in a row which is substantially perpendicular to said first group row, and
    said second group row being positioned and oriented to intercept the reflected paths established by said units of said first group.

4. The light beam positioning system of claim 3 wherein said optical elements of said units, said units of said groups, and said groups are united to form an integral composite structure.

5. The light beam positioning system of claim 4 wherein:
    said first optical elements are electro-optic crystals, and said second optical elements are polarizing prisms.

6. The light beam positioning system of claim 5 wherein said polarizing prism is a Glan-Thompson prism.

7. A system for positioning a polarized light beam in three dimensions X, Y and Z respectively, comprising:
    an array of light positioning units divided into first, second and third groups for positioning the light beam in the X, Y and Z dimensions respectively, each of said units including;
        a first optical element responsive to a field and operable to pass the light beam as received in response to a first field and to rotate the beam's polarization direction on passage of the beam in response to a second field, and
        a second optical element including reflective means arranged to receive light passed by said first optical element and to pass the beam unreflected over a first path when the light is polarized in one direction and to reflect the beam over a second path when the light is polarized in another direction,
    said first group comprising a plurality of said units positioned and arranged to pass the light unreflected over one path through successive units of said first group, said units of said first group being operable to individually provide a first reflected path representative of a certain position in the X dimension;
    said second group comprising a plurality of said units positioned and arranged to pass the light in the first reflected path through successive units of said second group, said units of said second group being operable to individually provide a second reflected path representative of a certain position in the Y dimension in addition to the certain position in the X dimension provided by said units in said first group;
    said third group comprising a plurality of said units positioned and arranged to pass the light in the second reflected path through successive units of said third group, said units of said third group being operable to individually provide a third reflected path representative of a certain position in the Z dimension in addition to the certain positions in the X and Y dimensions provided by said units in said first and second groups whereby the light may be positioned in the X, Y and Z dimensions by applying a field to a predetermined unit in each of said first, second and third groups.

8. The light beam positioning system of claim 7 wherein:
    said units in said third group are divided into a plurality of subgroups, said units in said subgroups being arranged in a stack-like relationship to form a plurality of rows positioned and arranged to pass the light in the second reflected path through successive units in said rows, said units being individually operable to provide a third reflected path.

9. The light beam positioning system of claim 8 wherein:
    said units in said subgroups are laterally elongated and form planar-like structures in the stack-like relationship, and
    light utilization means is positioned between individual units in said planar-like structures.

10. The light beam positioning system of claim 9 wherein:
    said utilization means is a light sensitive display means.

11. The light beam positioning system of claim 7 wherein:
    said array is united to form an integral structure.

References Cited

UNITED STATES PATENTS

| | | | |
|---|---|---|---|
| 2,030,235 | 2/1936 | Walton | 350—150 |
| 3,279,341 | 10/1966 | Arkell et al. | 350—150 X |
| 3,410,624 | 11/1968 | Schmidt | 350—150 |

OTHER REFERENCES

Shurcliff et al., Polarized Light (D. Van Nostrand Company, Inc., Princeton, New Jersey, 1964) pp. 49–51.

DAVID SCHONBERG, Primary Examiner

P. R. MILLER, Assistant Examiner

U.S. Cl. X.R.

350—151, 157

March 31, 1970  K. M. KOSANKE ET AL  3,503,670
MULTIFREQUENCY LIGHT PROCESSOR AND DIGITAL DEFLECTOR
Filed Jan. 16, 1967  3 Sheets-Sheet 1
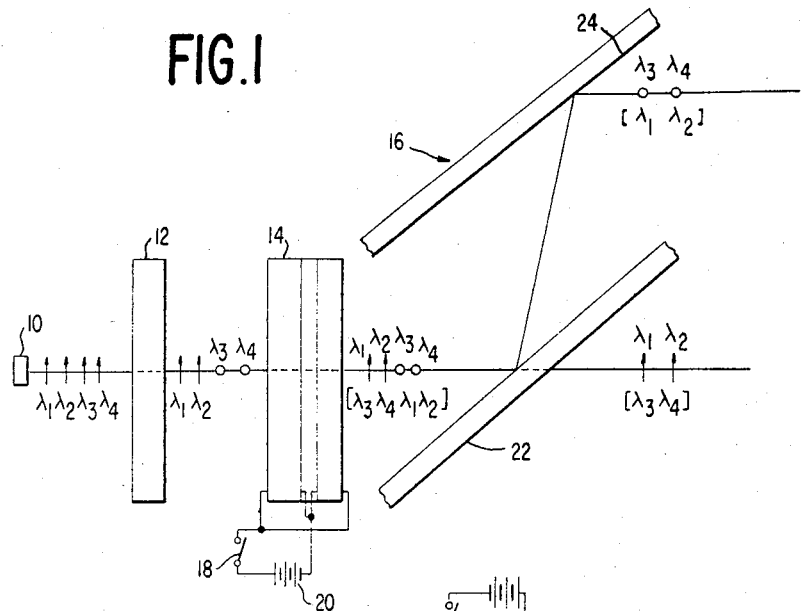
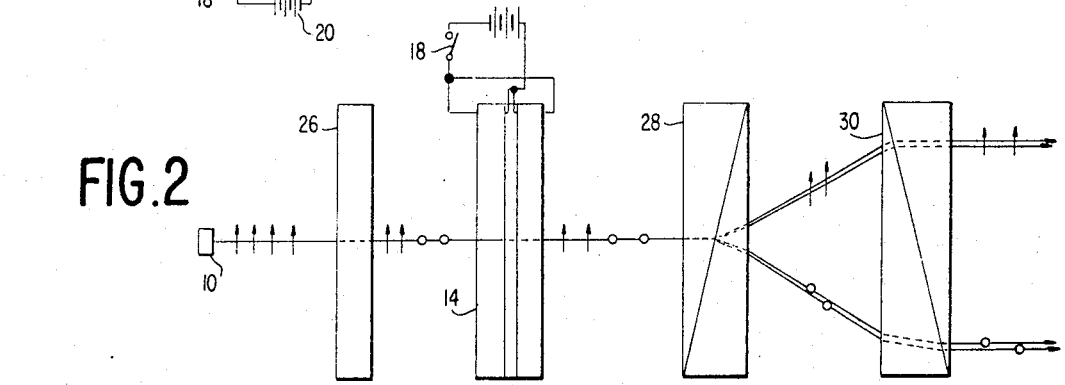
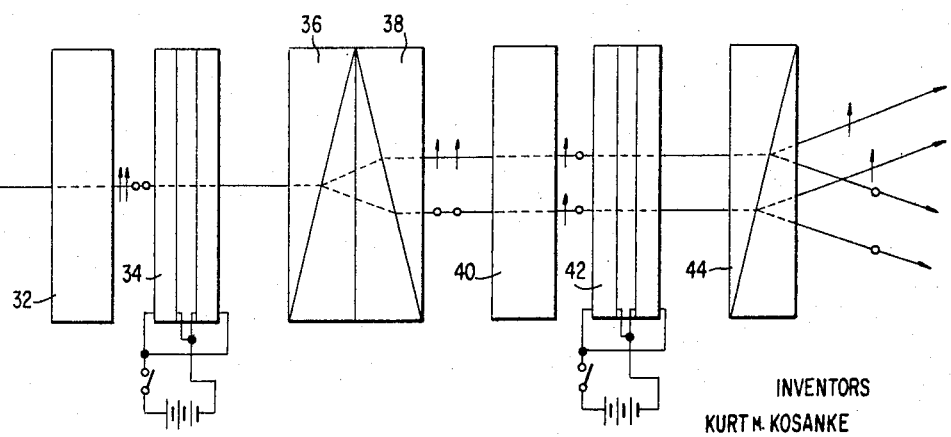
INVENTORS
KURT M. KOSANKE
WERNER W. KULCKE
ERHARD MAX
ATTORNEYS